Dec. 14, 1926.
G. H. THORPE
1,610,397
FLUSH VALVE
Filed August 22, 1925
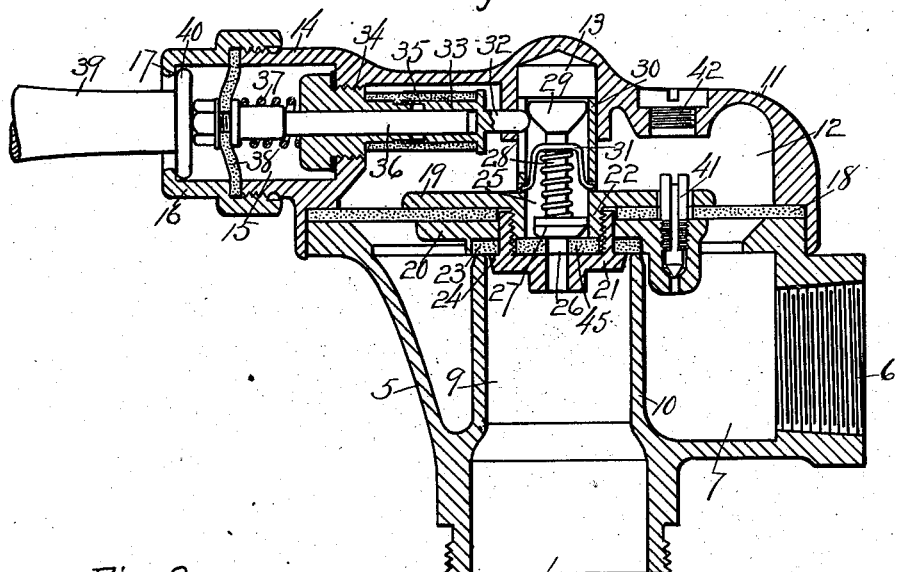
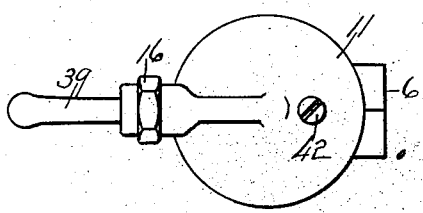
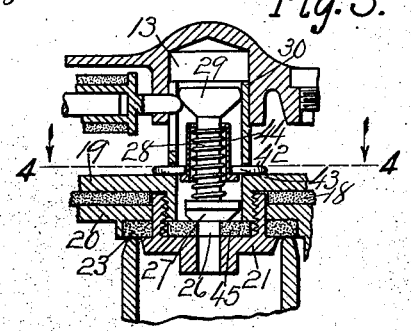
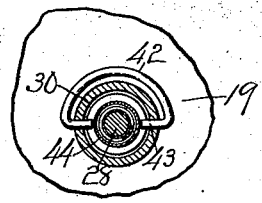
INVENTOR.
George H. Thorpe
BY
Arthur B. Jenkins
ATTORNEYS.

Patented Dec. 14, 1926.

1,610,397

UNITED STATES PATENT OFFICE.

GEORGE H. THORPE, OF HARTFORD, CONNECTICUT.

FLUSH VALVE.

Application filed August 22, 1925. Serial No. 51,809.

My invention relates more especially to that class of valves that are employed for flushing purposes in connection with water closets and similar structures, and an object of my invention, among others, is the production of a valve of this class that shall be simple in construction, particularly efficient in operation, with little liability of becoming disarranged or getting out of order.

One form of valve embodying my invention and in the construction and use of which the objects herein set out, as well as others, may be attained, is illustrated in the accompanying drawings, in which—

Figure 1 is a view in central section through my improved valve on a plane passing through the inlet, outlet and plunger supporting neck.

Figure 2 is a top view of said valve, on reduced scale.

Figure 3 is a detail view in central longitudinal section through the valve showing a modified form of construction.

Figure 4 is a sectional view taken on the line 4—4 of Figure 3.

In the accompanying drawings the numeral 5 indicates the body of my improved valve having an inlet opening 6 to an inlet chamber 7 and an outlet opening 8 from an outlet chamber 9, a circular wall 10 rising from the bottom of the inlet chamber separating said inlet and outlet chambers.

A cap 11 is secured to the upper end of the body in any desired manner, and is provided with a recess forming a compression chamber 12 with a recess 13 opening out of said compression chamber. The cap 11 has a neck 14 on one side with a recess therein comprising a plunger housing 15, a threaded hole opening from said recess into the compression chamber 12. A retainer 16 is secured to the end of the neck, said retainer having an opening in its end bounded by an annular lip 17.

A diaphragm 18 composed of any suitable flexible material, as leather, is clamped at its edge between the bottom edge of the cap 11 and the top edge of the body 5, and an upper valve plate 19 and a lower valve plate 20 are clamped to opposite sides of said diaphragm as by means of a recessed clamp nut 21 secured as by interengaging screw threads to a projection 22 from the lower side of the plate 19, said projection extending through a hole in said diaphragm and in the plate 20, and the nut 21 also extending upwardly through the hole in the plate 20. A valve packing 23 is clamped between a flange 24 on the nut 21 and the lower face of the plate 20, said packing being adapted to be seated on the upper edge of the wall 10 that serves as a valve seat. A relief valve recess 25 is formed in the projection 22, this recess being preferably closed at its inner end by a relief valve packing 45, and a vent opening 26 extends from said vent recess through the said relief valve packing and through the clamp nut 21 into the outlet chamber 9.

A relief valve 27 is seated against the packing 45 within the recess 25, said relief valve having a stem 28 with a head 29 extending into and located within a valve cylinder 30 extending into the recess 13. The valve 27 may be pressed against its seat as by means of a spring on the stem 28 thrusting against the valve and against a spring support 31 extending across the recess 25 and having its end inserted in holes in the cylinder 30. It is not absolutely essential, however, that this spring shall be employed.

The head 29 is tapered on its under side to receive a tip 32 of a nose 33, said tip projecting through a slot in the side of the valve cylinder 30, and as shown in Figure 1. This nose is slidably or loosely connected with the reduced end of a plunger guide 34 screw threaded into the hole between the housing 15 and the compression chamber 12, the end of said guide being located in the compression chamber. In the structure herein shown the nose is slidably mounted on the end of the plunger. A sleeve packing 35 envelops the projecting end of the guide and the plunger nose, said packing resting against a shoulder formed on the plunger guide and on a flange on said nose.

A plunger 36 extends through the plunger guide and into an opening in the end of the nose 33, said parts being so arranged that the inner end of this plunger is spaced from the bottom of the opening. The plunger is forced outwardly as by a spring 37 abutting against a shoulder on the plunger and a plunger packing 38 may be employed if desired, and if used it is engaged with the plunger and has its edge clamped between a shoulder within the retainer 16 and the end of the neck 14.

A handle 39 extends into the housing 15 and is provided with a flanged end 40 resting against the lip 17, the handle being enough smaller than the opening to permit of a tipping movement of the handle. Its end rests against the end of the plunger 36, in the structure herein shown this end comprising the head of a bolt that clamps the packing 38 to the plunger. An equalizer valve 41 is located in an opening extending through the plates 19 and 20, said valve being accessible through an opening closed by a screw plug 42.

The operation of the device will be readily understood by those skilled in the art, it being briefly stated that the handle 39 being tipped to one side the plunger 36 is moved inwardly until it engages with the plunger nose that in turn pressing against the tapered part of the head 29 raises the valve 27, thus permitting escape of the liquid from the compression chamber 12 and reducing pressure therein, whereupon pressure in the chamber 7 raises the diaphragm and the valve 23 from its seat allowing water to flow freely from the chamber 7 through the outlet 8. Upon releasing the handle 39 the valve 27 is permitted to seat itself and close the vent opening 26, whereupon pressure is again built up in the chamber 12 through the equalizer 41 until the diaphragm is moved downwardly and the valve 23 is again seated to stop the flow of water through the outlet 8.

By providing a double packing for the plunger 36 leaking of fluid around the plunger and through the neck 14 is obviated and the elastic connection comprising the sleeve packing 35 between the plunger nose and the plunger guide serves the double purpose of a means for returning the plunger nose to its normal position and also for packing the joint at this point, said sleeve being located in the compression chamber 12 partaking of the pressure therein to seal the joint. The plunger is guided at one end by the hole in the plunger guide and at its opposite end by the tip 32 extending into a hole in the side of the wall of the recess 13 and the spring 37 forcing the plunger out against the handle relieves any tendency of the latter to become wobbly.

The construction of the plates 19 and 20 clamping the diaphragm 18, the valve packing 23 and the packing 45 between them, said plates being forced together by the nut 21, enables these elastic members to be compressed to such extent that no leakage around them will occur.

In the structure shown in Figures 3 and 4 the spring support for the spring of the valve 27 is located outside of the cylinder 30, this support 42 being of semi-circular shape with its ends projecting toward each other, said ends 43 overlying a flange on the lower end of a cap 44 within which the spring for the valve 27 is located, said spring being thus held at one end by the cap, which in turn is held by the ends of the supports 42, and the latter is held by the cylinder 30.

In accordance with the provisions of the patent statutes I have described the principles of operation of my invention, together with the device which I now consider to represent the best embodiment thereof; but I desire to have it understood that the device shown in only illustrative and that the invention may be carried out by other means and applied to uses other than those above set out.

I claim—

1. A flush valve body having an inlet, an outlet and a compression chamber, a diaphragm separating said compression and other chambers, clamping plates on opposite sides of the diaphragm, one of said plates having a projection extending through the other plate, a flanged clamping nut extending through said other plate and screw threadedly engaging said projection to secure said plates together, a valve packing located between the flange on said nut and the face of one of said plates, and means for relieving the pressure in the compression chamber.

2. A flush valve body having an inlet, an outlet and a compression chamber, a diaphragm separating said compression and other chambers, clamping plates on opposite sides of said diaphragm, one of said plates having a projection with a relief valve recess therein, a nut fitting said projection to draw the plates together and clamp them to the diaphragm, a valve packing located between said nut and the face of one of said plates and forming the bottom of said relief valve recess, and means for operating said relief valve to reduce the compression in said compression chamber.

3. A flush valve body having an inlet, an outlet and a compression chamber, a diaphragm separating said compression and other chambers and supporting a main valve, plates secured to opposite sides of said diaphragm, one of said plates having a projection forming a cylinder extending into a recess in the top of the valve body, a valve located in a recess in one of said plates and having a stem extending into said cylinder, said valve closing a vent opening from said compression to said outlet chambers, and means for operating said valve through said stem to uncover said vent opening.

4. A flush valve body having an inlet, an outlet, and a compression chamber, a diaphragm separating said compression and other chambers, a main valve supported by said diaphragm to close the outlet from said valve body, a relief valve to close a vent opening from the compression to the outlet chambers, said valve having a stem extending upwardly within the compression chamber, a plunger engaged with said stem to operate said valve, and means for operating said plunger.

5. A flush valve body having an inlet, an outlet and a compression chamber, a diaphragm separating said compression and other chambers, a main valve supported by said diaphragm to close an outlet opening from said valve body, a relief valve to close a vent opening between said compression and outlet chambers, said relief valve having a stem, a head located on said stem and having a sloping surface, a member longitudinally movable to engage said sloping surface and remove said valve from its seat, and means for operating said member.

6. A flush valve body having an inlet, an outlet and a compression chamber, a diaphragm separating said compression and other chambers, a plate carried by said diaphragm and having an upwardly extending projection forming a cylinder, a main valve carried by said diaphragm to control flow of liquid through said body, a relief valve to close an opening between said compression and outlet chambers, a stem secured to said valve and having a sloping head located in said cylinder, a member projecting through a hole in the wall of the cylinder to engage said head, and means for operating said member to remove said relief valve from its seat.

7. A flush valve body having an inlet, an outlet and a compression chamber, a diaphragm separating said compression and other chambers, a main valve carried by said diaphragm to control flow of liquid through said body, a relief valve to control a vent opening from said compression to said outlet chambers, a member movably mounted to operate said relief valve, a plunger permanently connected with said member to operate it and having a limited movement independently thereof, and means for operating said plunger.

8. A flush valve body having an inlet, an outlet and a compression chamber, a diaphragm separating said chambers, a main valve carried by said diaphragm to control flow of liquid through said body, a relief valve to control a vent opening from said compression to said outlet chambers, a plunger nose adapted to be operatively connected with the relief valve to operate it, a guide, means for connecting said guide and nose to permit movement of one independently of the other, and a plunger operatively engaging with said nose to operate it.

9. A flush valve body having an inlet, an outlet and a compression chamber, a diaphragm separating said chambers, a main valve operated by said diaphragm to control flow of liquid through said body, a relief valve to control a vent opening from said compression to said outlet chambers, a plunger nose operatively connected with said relief valve to operate it, a guide to which said plunger nose is movably attached, means for connecting said nose and guide to permit movement of one independently of the other, and a plunger extending through said guide and loosely engaging said nose to operate it.

10. In combination in a flush valve, a relief valve therefor, a tapered head connected with said relief valve, a longitudinally movable plunger operatively connected with said head to operate it, a spring exerting pressure upon said relief valve, a plunger packing secured to said plunger and closing the housing within which said plunger is located, and means for operating said plunger.

11. In combination in a flush valve including a relief valve, a tapered head connected with the relief valve, a plunger nose engaged with said tapered head, a plunger guide, an elastic sleeve connecting said guide and nose, the latter having a movement independently of said guide, a plunger extending through said guide and loosely engaging said nose, a plunger packing closing the housing within which said plunger extends, and means for operating said plunger.

12. In combination in a flush valve, a relief valve therefor, an enlarged tapered head rigidly connected with said relief valve and having a tapered under surface, a plunger independently longitudinally movable with respect to said head to operate it, and means for operating said plunger.

13. In combination in a flush valve comprising a body having an inlet, an outlet and a compression chamber, a diaphragm separating said compression and other chambers, a main valve supported by said diaphragm, an auxiliary valve having a stem projecting into said compression chamber, and an initial operating device extending into said chamber at substantially right angles to the axis of the opening for the auxiliary valve, said operating member being connected with said auxiliary valve for operation thereof.

14. In combination in a flush valve comprising a body having an inlet, an outlet and a compression chamber, a diaphragm separating said compression and other chambers, a main valve supported by said diaphragm, an auxiliary valve having a stem projecting into said compression chamber, an initial operating device extending into said chamber at substantially right angles to the axis of the opening for the auxiliary valve, said operating member being connected with said auxiliary valve for operation thereof, and a valve controlled equalizing port located in and projecting through said diaphragm at one side of the center thereof outside of the outlet chamber.

15. In combination in a flush valve comprising a body having an inlet, an outlet and a compression chamber, a diaphragm separating said compression and other chambers, a main valve supported by said diaphragm, an auxiliary valve having a stem projecting into said compression chamber, and an initial operating device movable into said compression chamber for engagement and operation of said auxiliary valve, said device having means whereby its movement into the chamber will reduce the space therein and thereby increase the compression in said chamber.

16. In combination in a flush valve comprising a body having an inlet, an outlet and a compression chamber, a diaphragm separating said compression and other chambers, a main valve supported by said diaphragm, an auxiliary valve located in the compression chamber, and an initial operating device whose line of action is substantially at right angles to the axis of the diaphragm opening for the auxiliary valve, said operating member being connected with said auxiliary valve for operation thereof.

GEORGE H. THORPE.